(12) United States Patent
Kawabe et al.

(10) Patent No.: US 7,658,403 B2
(45) Date of Patent: Feb. 9, 2010

(54) SIDE AIRBAG APPARATUS

(75) Inventors: Hitoshi Kawabe, Aichi-ken (JP); Masaaki Okuhara, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/155,955

(22) Filed: Jun. 12, 2008

(65) Prior Publication Data
US 2008/0315565 A1 Dec. 25, 2008

(30) Foreign Application Priority Data
Jun. 19, 2007 (JP) ............................. 2007-161353

(51) Int. Cl.
*B60R 21/20* (2006.01)
(52) U.S. Cl. .................. 280/730.2; 280/738; 280/743.1
(58) Field of Classification Search ............. 280/730.2, 280/738, 743.1, 743.2
See application file for complete search history.

(56) References Cited

U.S. PATENT DOCUMENTS

| 5,927,750 | A * | 7/1999 | Nakamura et al. ....... 280/730.2 |
| 6,279,944 | B1 * | 8/2001 | Wipasuramonton et al. ....................... 280/730.2 |
| 7,168,736 | B2 * | 1/2007 | Tanase et al. ............. 280/730.2 |
| 7,207,595 | B2 * | 4/2007 | Kanto et al. ............. 280/730.2 |
| 7,350,811 | B2 * | 4/2008 | Sato ........................ 280/743.2 |
| 7,384,062 | B2 * | 6/2008 | Yokoyama et al. ....... 280/730.2 |
| 7,396,042 | B2 * | 7/2008 | Mabuchi et al. .......... 280/730.2 |
| 7,431,332 | B2 * | 10/2008 | Wipasuramonton et al. ........................ 280/730.2 |
| 2004/0124615 | A1 * | 7/2004 | Tanase et al. ............. 280/730.2 |
| 2004/0130127 | A1 * | 7/2004 | Kurimoto et al. ........... 280/729 |
| 2006/0103119 | A1 * | 5/2006 | Kurimoto et al. ........ 280/730.2 |
| 2006/0108777 | A1 * | 5/2006 | Mabuchi et al. .......... 280/730.2 |
| 2006/0220358 | A1 * | 10/2006 | Umehara ................. 280/730.2 |
| 2006/0267318 | A1 * | 11/2006 | Nishikaji et al. ......... 280/730.2 |
| 2007/0170707 | A1 * | 7/2007 | Sato et al. ................ 280/730.2 |

FOREIGN PATENT DOCUMENTS

| JP | A-8-225054 | 9/1996 |
| JP | A-2001-114065 | 4/2001 |

* cited by examiner

*Primary Examiner*—Toan C To
(74) *Attorney, Agent, or Firm*—Posz Law Group, PLC

(57) ABSTRACT

A side airbag apparatus is provided with an airbag which is stored within a vehicle seat. A rear portion of the airbag is fixed to the vehicle seat. Further, the side airbag apparatus is provided with an inflator which is arranged within a rear portion of the airbag and is fixed to the vehicle seat. The side airbag apparatus jets out gas from the inflator in correspondence to an impact applied to a vehicle from a side direction, and inflates and deploys the airbag between a body side portion and the vehicle seat. Further, a vent hole for discharging the gas within the airbag is provided between a gas outlet of the inflator and at least one of an upper end and a lower end of a rear portion of the airbag. Further, the airbag is folded in such a manner as to start and finish an inflation of the airbag finally in the vicinity of the vent hole between the vent hole and the gas outlet.

7 Claims, 10 Drawing Sheets

Front ← → Rear

Front ← → Rear

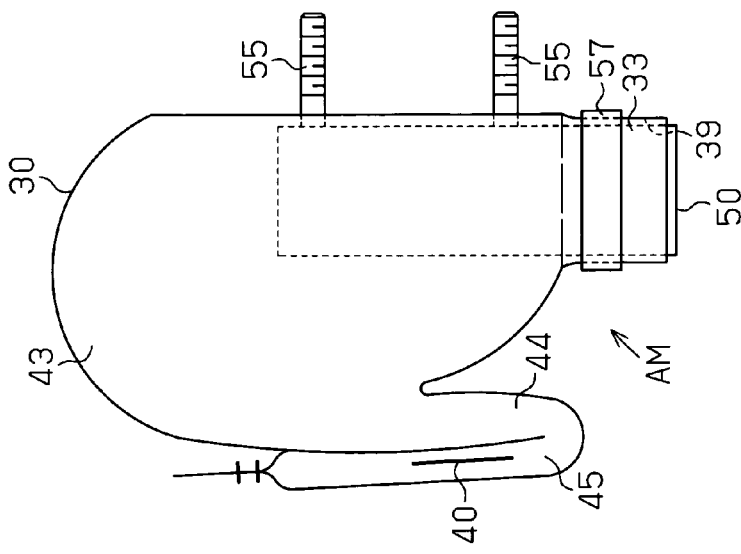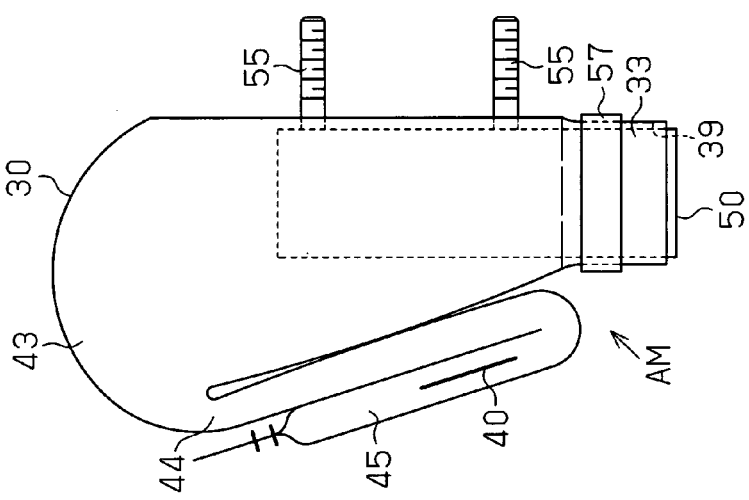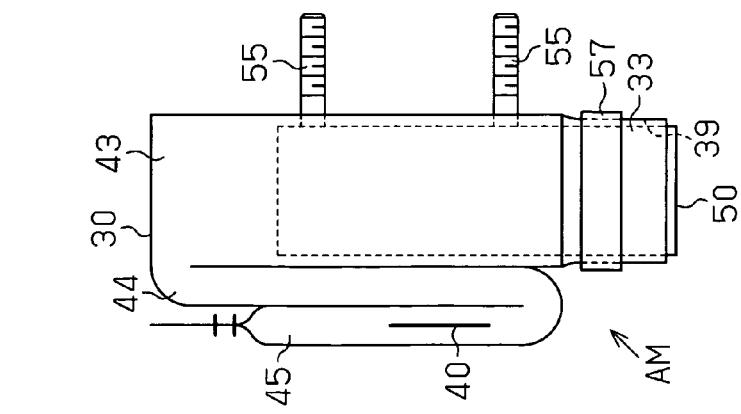

SIDE AIRBAG APPARATUS

BACKGROUND OF THE INVENTION

The present invention relates to a side airbag apparatus structured such as to inflate and deploy an airbag between a body side portion and a seat for a vehicle in the case that an impact is applied to the vehicle from a side direction, and to reduce the impact by the airbag so as to protect an occupant.

A side airbag apparatus is widely known as an apparatus for protecting an occupant from impact applied from a side of a vehicle, such as in the case of side collision. The side airbag apparatus includes an inflator and an airbag or the like. The airbag is stored in a seat back (a backrest portion) of the seat for the vehicle in a state of being folded so as to be made compact.

In the side airbag apparatus, when an impact is applied from the side of a body side portion of a vehicle, the inflator discharges gas into the airbag. The airbag is inflated and deployed by the gas and shoots forward out of the seat back in a state of leaving a part of the airbag within the seat back. The airbag is then inflated and deployed forward from the backrest in a narrow space between the occupant seated in the vehicle seat and the body side portion. The inflated and deployed airbag is interposed between the occupant and the body side portion making an intrusion into a passenger compartment so as to restrain the occupant. The gas within the airbag is thereafter discharged to the outside of the airbag through a vent hole provided in the airbag. The impact transmitted to the occupant from the side direction through the body side portion is reduced on the basis of the inflation and deployment of the airbag and the reduction of the internal pressure of the airbag caused by discharge of the gas.

In many cases, the vent hole is provided in a vehicle outer side or a vehicle inner side in the airbag in a state of being deployed without being filled with the gas. In addition, there have been proposed a side airbag apparatus in which a vent hole is provided in a front end of an airbag as disclosed in Japanese Laid-Open Patent Publication No. 8-225054, a side airbag apparatus in which a vent hole is provided in a vehicle seat as disclosed in Japanese Laid-Open Patent Publication No. 2001-114065.

In accordance with any one of the side airbag apparatuses mentioned above, the vent hole is provided in a section which is away from a gas outlet of an inflator for delaying a discharge timing of the gas from the airbag. However, in the apparatus disclosed in each of the publications, only the position of the vent hole is contrived. Accordingly, there is a risk that that the gas is unnecessarily discharged through the vent hole from a starting time of the inflation of the airbag. Therefore, the amount of the gas fed to the airbag from the inflator is reduced at an amount of the gas discharged at the starting time of the inflation of the airbag. Accordingly, an ascent of an internal pressure of the airbag is deadened and the speed of inflating and deploying the airbag becomes slower.

SUMMARY OF THE INVENTION

An objective of the present invention is to provide a side airbag apparatus which reduces loss of gas caused by discharge of gas at the starting time of inflation of the airbag, thereby suppressing reduction of the deploying speed of the airbag caused by the gas discharge from a vent hole.

To achieve the foregoing objective and in accordance with one aspect of the present invention, a side airbag apparatus including an airbag stored within a vehicle seat, and an inflator arranged within the rear portion of the airbag and fixed to the vehicle seat is provided. A rear end portion of the airbag is fixed to the vehicle seat. Gas is jetted out from the inflator in correspondence to an impact applied to a vehicle from a side direction. The airbag is caused to shoot out forward from the vehicle seat by the gas. The airbag is inflated and deployed between a body side portion of the vehicle and the vehicle seat. The airbag has a vent hole for discharging the gas within the airbag. The vent hole is provided between a gas outlet of the inflator and at least one of an upper end and a lower end of a rear portion of the airbag. The airbag is folded in such a manner that a portion that is in the vicinity of the vent hole and between the vent hole and the gas outlet starts and finish being inflated in a final stage of the deployment and inflation of the airbag.

BRIEF DESCRIPTION OF THE DRAWINGS

FIGS. 10A to 10C are schematic explanatory views explaining a process in which the folded portion of the airbag is deployed from the folded state;

DETAILED DESCRIPTION OF THE PREFERRED EMBODIMENTS

One embodiment of the present invention will now be described with reference to the drawings. Hereinafter, the forward direction of a vehicle will be referred to as the front of the vehicle, and the backward direction of the vehicle will be referred to as the back of the vehicle. The vertical direction refers to the vertical direction of the vehicle, and the left and right direction refers to the width direction of the vehicle, that is, the left and right direction when the vehicle is driving forward.

Figure 1:
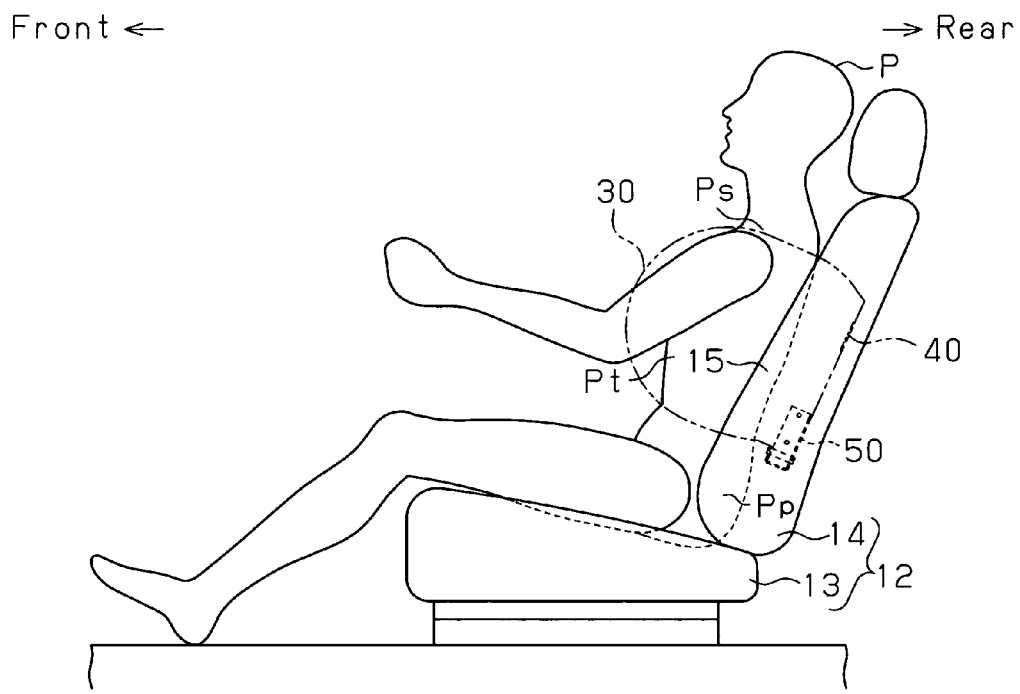
FIG. 1 is a side view showing a vehicle seat to which a side airbag apparatus in accordance with one embodiment of the present invention is applied.
Figure 2:
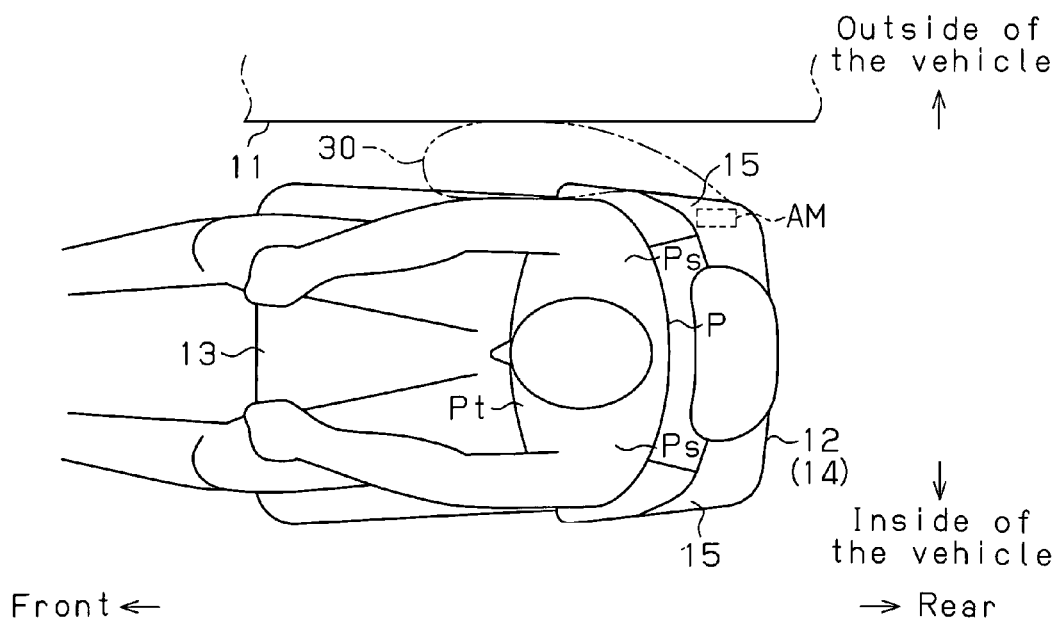
FIG. 2 is a plan view for explaining the positional relationship between the vehicle seat and a body side portion.

As shown in FIGS. 1 and 2, in the vehicle, a vehicle seat 12 is arranged in the vicinity of a body side portion 11 in the passenger compartment. The body side portion 11 is a component of the side portion of the vehicle, and is mainly composed of a door, a pillar, and the like. Part of the body side portion 11 corresponding to the front seat includes a front door, a center pillar (B-pillar), and the like. Part of the body side portion 11 corresponding to the rear seat includes a rear part of the side door (rear door), a C-pillar, a front part of the wheel well, a rear quarter, and the like. The vehicle seat 12 includes a seat cushion (seat portion) 13 and a seat back (backrest portion) 14.

Figure 5:
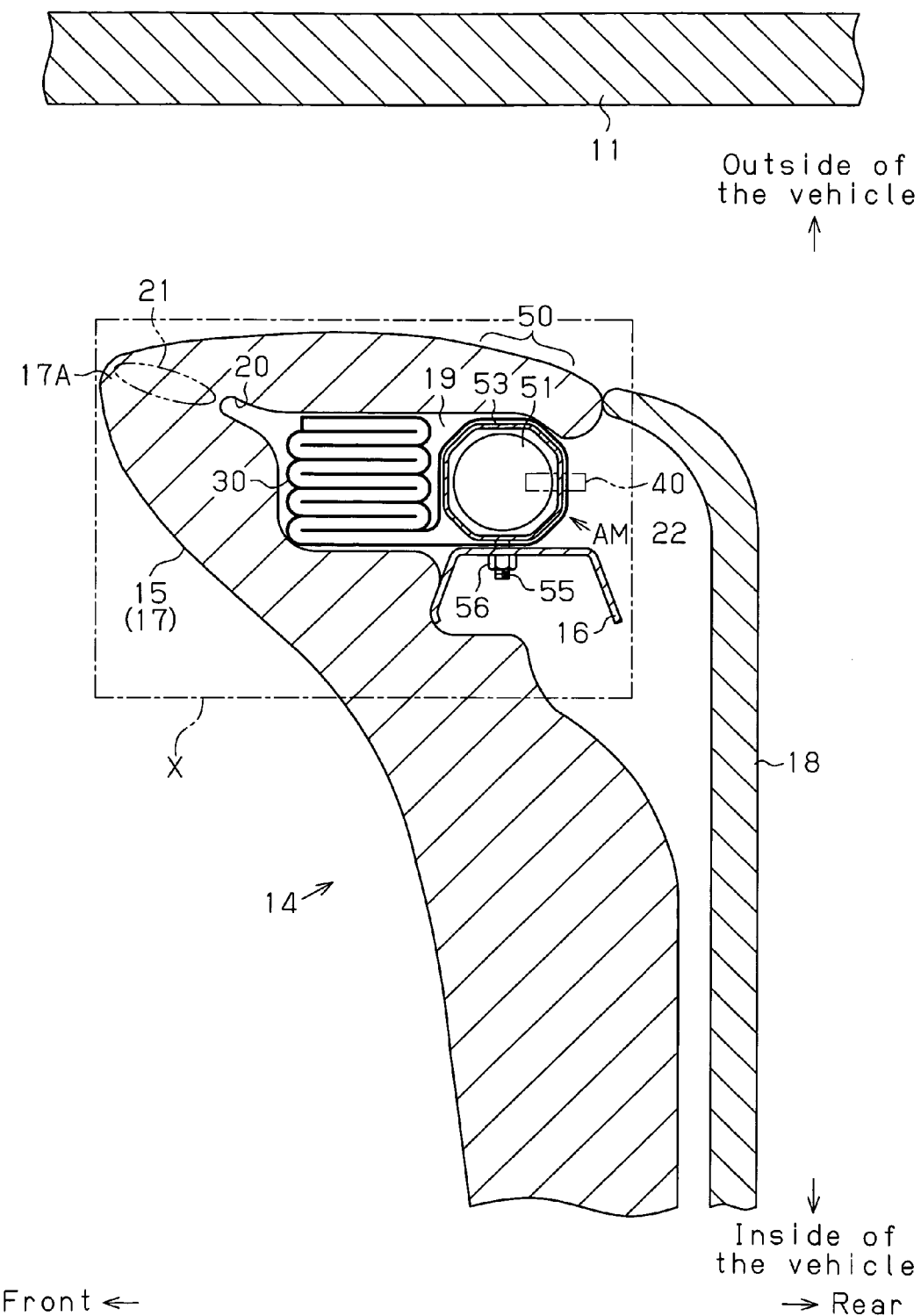
FIG. 5 is a partially plan cross-sectional view showing an internal structure in a vehicle outer side of a seat back.

As shown in FIGS. 2 and 5, a pair of side support portions 15 are provided in a front portion of the seat back 14. The side support portions 15 are respectively provided in both side portions of the seat back 14. The side support portions 15 support an occupant P in such a manner as to limit a motion in a vehicle width direction of the occupant P reclining against the seat back 14.

Next, a description will be given of an internal structure of a side portion in a vehicle outer side including the side support portion 15 in the seat back 14.

Figure 6:
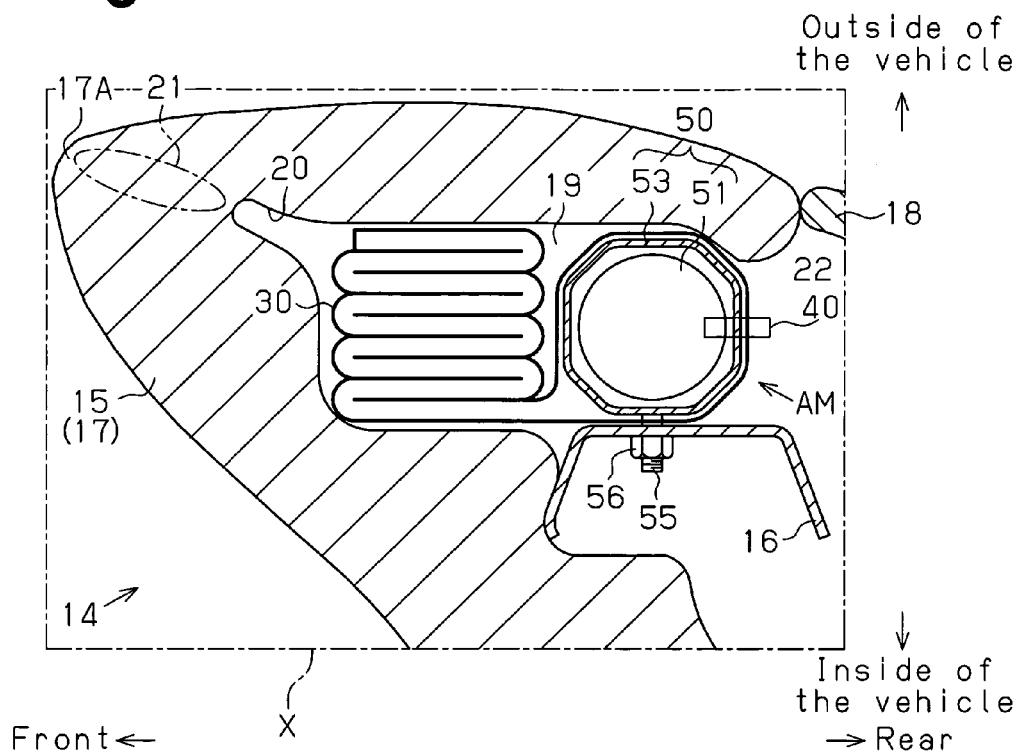
FIG. 6 is a partially plan cross-sectional view showing a portion X in FIG. 5 in an enlarged manner.

As shown in FIGS. 5 and 6, a seat frame forming a framework of the seat back 14 is arranged within the seat back 14. A part of the seat frame is arranged within the side support portion 15 of the seat back 14. The part of the seat frame within the side support portion 15 is formed as a side frame portion 16 by bending a metal plate. A seat pad 17 made of an elastic material such as urethane foam or the like is arranged in a front side of the seat frame including the side frame portion 16. Further, a hard back board 18 formed by a synthetic resin or the like is arranged in a rear side of the seat frame. The back board 18 is backward away from the seat frame. The seat pad 17 is coated by a cover (not shown).

The seat pad 17 is provided with a storage space 19 for incorporating an airbag module AM. The storage space 19 is provided in a vehicle outer side in the vicinity of the side frame portion 16.

A slit 20 is provided in a corner portion in a front side of the storage space 19. The slit 20 is provided in a vehicle outer side of the storage space 19, and extends diagonally forward to the vehicle outer side. The seat pad 17 is provided with a breakable portion 21 which is broken by an airbag 30. The breakable portion 21 is positioned between a corner portion 17A in a front side of the seat pad 17 and the slit 20. The airbag module AM includes an airbag 30 and an inflator assembly 50. Next, a description will be given of each of members constructing the airbag module AM.

<Airbag 30>

Figure 3:
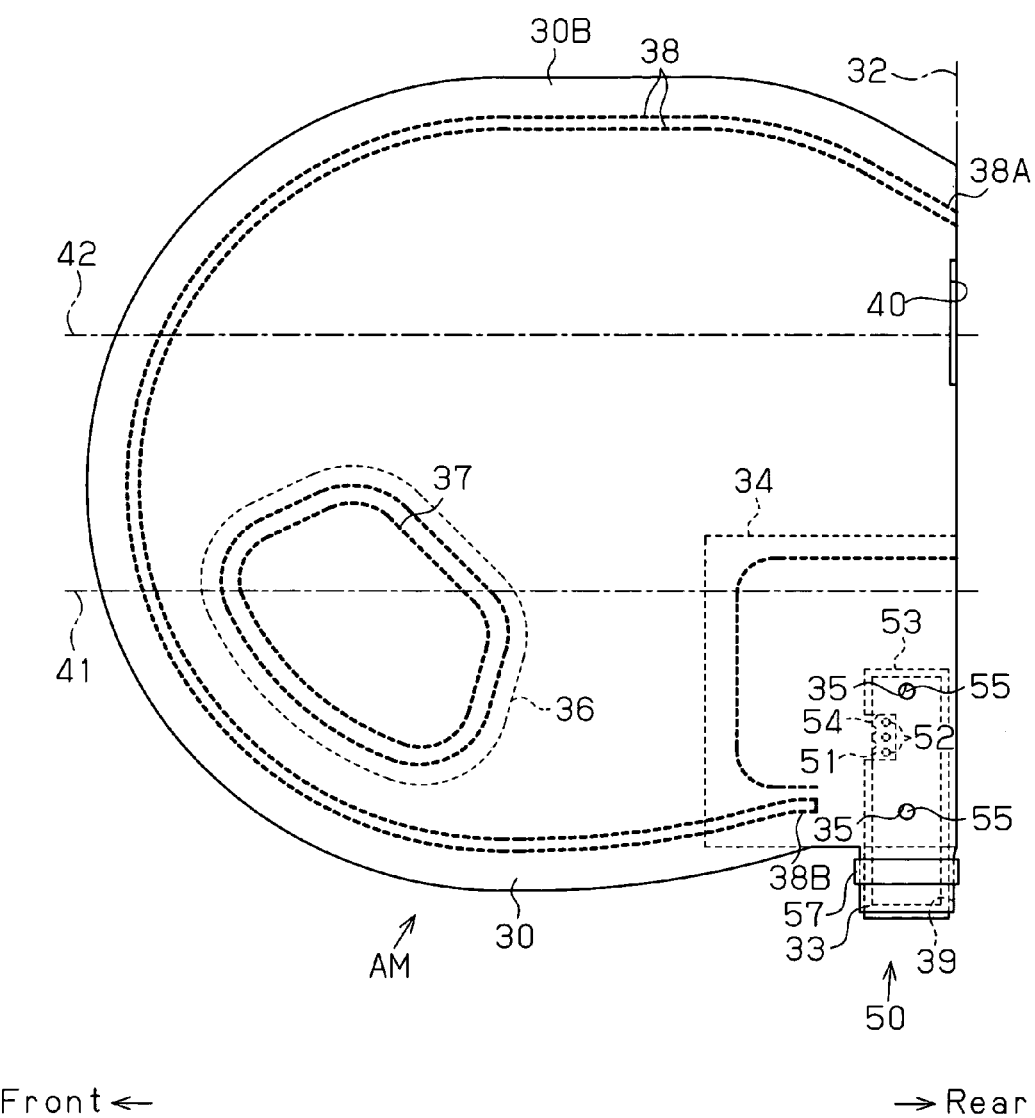
FIG. 3 is a side view showing an airbag and an airbag module in a state of being deployed without being filled with a gas.
Figure 4A:
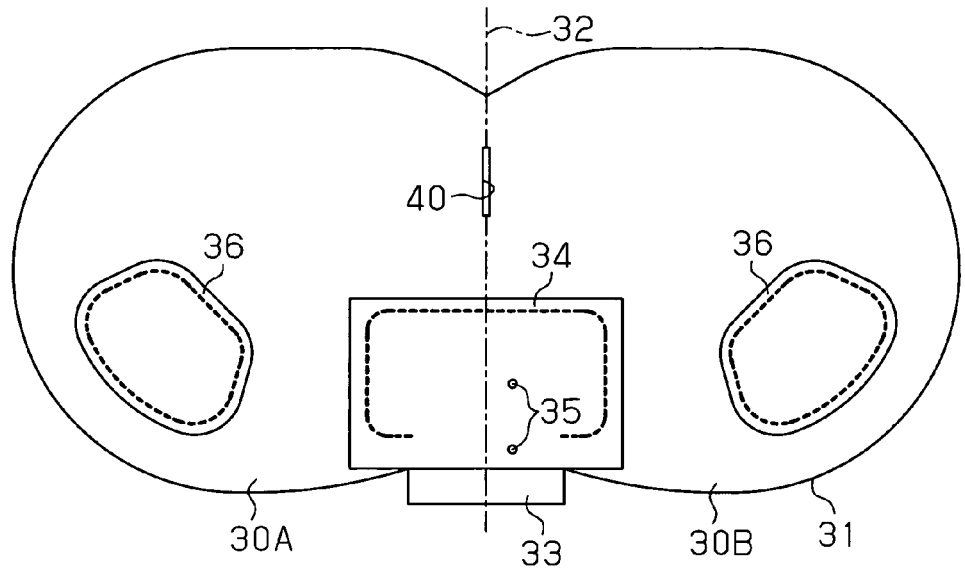
FIG. 4A is a front view showing a base fabric sheet before being folded into two.
Figure 4B:
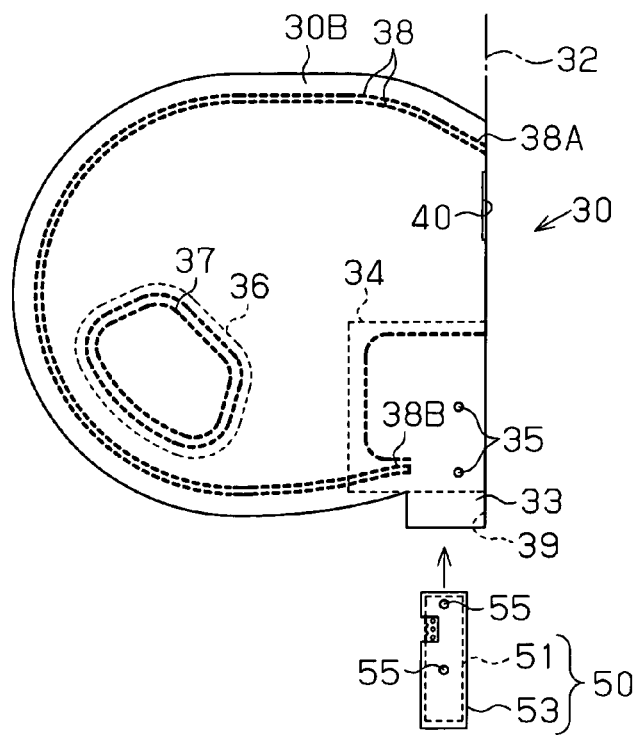
FIG. 4B is a front view showing the base fabric sheet in a state of being folded into two and being provided with a peripheral edge coupling portion.

FIG. 3 shows the airbag 30 in a state of being deployed without being filled with a gas. Further, FIGS. 4A and 4B show forms in process of manufacturing the airbag 30.

As shown in FIGS. 3 and 4, the airbag 30 is provided with a pair of overlapping portions 30A and 30B in an outer side and an inner side. The overlapping portions 30A and 30B are formed by folding one base fabric sheet 31 having a symmetrical shape into two along a center fold line 32 of the base fabric sheet 31. As the base fabric sheet 31, there is used a raw material which has a high strength, has a flexibility and can be easily folded, for example, a woven fabric or the like constituted by polyester yarn, polyamide yarn or the like is used. The overlapping portions 30A and 30B may be formed by overlapping two base fabric sheets. In this case, each of the base fabric sheets constructs each of the overlapping portions 30A and 30B.

An installation portion 33 protruding downward is formed in the base fabric sheet 31. The installation portion 33 is also folded along the fold line 32 in the middle of the base fabric sheet 31. An inflator assembly 50 is fastened to the installation portion 33.

A reinforcing fabric sheet 34 is provided in a lower portion in the middle of the base fabric sheet 31 for increasing the strength of both overlapping portions 30A and 30B with respect to a heat of the gas. The reinforcing fabric sheet 34 is seamed to both overlapping portions 30A and 30B in a state of spreading on both overlapping portions 30A and 30B.

In the overlapping portion 30B and the reinforcing fabric sheet 34 in the right side shown in FIG. 4A, a plurality of bolt insertion holes 35 are provided in a section near the other overlapping portion 30A. The bolt insertion hole 35 is provided in a lower portion of the airbag 30.

A reinforcing fabric sheet 36 is arranged in a lower portion of each of the overlapping portions 30A and 30B. Each of the reinforcing fabric sheets 36 is seamed in the corresponding one of the overlapping portions 30A and 30B. Each of the reinforcing fabric sheets 36 is used as a section in which the overlapping portions 30A and 30B are seamed to form a seam 37. The seam 37 limits an inflation of the airbag 30 in a vehicle width direction at a time when the airbag 30 is inflated and deployed.

The airbag 30 is formed by bonding a peripheral edge coupling portion 38 of the overlapping portions 30A and 30B. In the peripheral edge coupling portion 38, peripheral edge portions of both overlapping portions 30A and 30B are seamed by using two sewing threads. A number of the sewing thread used at this time may be set to one, or two or more. The peripheral edge coupling portion 38 may be formed, for example, by bonding using an adhesive agent, in addition to the seaming using the sewing thread.

An upper end 38A of the peripheral edge coupling portion 38 is positioned on the fold line 32 between the overlapping portions 30A and 30B. A lower end 38B of the peripheral edge coupling portion 38 is positioned in the vicinity of the installation portion 33 of the overlapping portions 30A and 30B. The lower end 38B of the peripheral edge coupling portion 38 is positioned at a position which is somewhat away forward from the fold line 32. An insertion port 39 for inserting the inflator assembly 50 is provided between the fold line 32 and the lower end 38B of the peripheral edge coupling portion 38.

The overlapping portions 30A and 30B have such a size and shape that can protect a thorax Pt of the occupant P seated on the vehicle seat 12 (refer to FIGS. 1 and 2) at a time when the inflation and deployment of the airbag 30 is finished. The size and shape of the overlapping portions 30A and 30B are set in correspondence to a region in which the airbag 30 protects the occupant P. As a region to be protected by the airbag 30, for example, there can be listed up a region from a lumbar region Pp of the occupant P to the thorax Pt, a region from the lumbar region Pp to a shoulder part Ps and the like.

<Inflator Assembly 50>

As shown in FIGS. 3 and 6, the inflator assembly 50 includes a gas source, which is an inflator 51 in the first embodiment, and a retainer 53 mounted on the outer surface of the inflator 51. The inflator 51 is formed as a substantially columnar shape extending in a vertical direction. The inflator 51 accommodates a gas generating agent (not shown). In the inflator 51 of a pyro type mentioned above, the gas is generated by a burning reaction of a gas generating agent. A gas outlet 52 for jetting the gas outward along a radial direction is provided in an upper portion of the inflator 51. A harness (not shown) corresponding to a wiring for applying a control signal to the inflator 51 is connected to a lower end of the inflator 51. In place of the pyro type inflator, it is possible to employ a hybrid type inflator which spurts the gas by breaking a partition wall of a high-pressure gas cylinder filled with a high-pressure gas by low explosive.

A retainer 53 has a function of fastening the inflator 51 to the side frame portion 16 together with the airbag 30 as well as a function of a diffuser. Most of the retainer 53 is constituted by a substantially elongated cylindrical body extending in the vertical direction, and is formed by bending a metal plate. A window portion 54 which is open to a front side is provided in an upper portion of the retainer 53. The gas outlet 52 of the inflator 51 is exposed from the window portion 54. The gas is jetted forward from the gas outlet 52 through the window portion 54. A plurality of bolts 55 (refer to FIG. 10) are provided in the retainer 53.

The inflator assembly 50 is inserted into a rear portion of the airbag 30 through an insertion port 39. The bolts 55 of the retainer 53 protrude to the outside of the airbag 30 in a state of being inserted to bolt insertion holes 35 in the base fabric sheet 31 and the reinforcing fabric sheet 34. In this state, the inflator 51 is arranged in a state of standing upright in a lower end of the rear portion of the airbag 30. An annular fastening tool 57 is fitted to the inflator 51 from the outside of the installation portion 33. Since the fastening tool 57 is swaged such as to be reduced in diameter, the installation portion 33 is fastened to the inflator assembly 50 at a lower position than the gas outlet 52. In order to almost close the insertion port 39, the installation portion 33 may be fastened in an airtight manner to the inflator assembly 50 by the fastening tool 57. Further, other means may be used in place of or in addition to the fastening tool 57.

The inflator 51 may be previously provided integrally with the retainer 53.

The airbag module AM is made compact (hereinafter, refer to as "storage mode") by folding the airbag 30 from the deployed state, and is accommodated in the storage space 19 of the seat back 14 in a state in which the inflator assembly 50 is arranged in the rear portion of the airbag 30. Further, the bolt 55 of the retainer 53 is fastened to the side frame portion 16 within the seat back 14 by a nut 56. The inflator assembly 50 is fixed to the side frame portion 16 together with the airbag 30 on the basis of this fastening. The inflator 51 is fixed in a state of being away forward from the back board 18 of the seat back 14 (refer to FIG. 5).

The airbag 30 is inflated approximately as follows by the gas from the inflator 51. Immediately after the feed of gas is started, the airbag 30 is inflated and deployed in the storage space 19 of the seat pad 17. In an inflating and deploying process at this time, the airbag 30 breaks the breakable portion 21 of the vehicle seat 12. Further, the airbag 30 shoots out from the vehicle seat 12 in a state of leaving a part of the airbag 30 in the storage space 19. As shown by a two-dot chain line in FIG. 2, the airbag 30 is inflated and deployed forward from the vehicle seat 12, between the body side portion 11 and the vehicle seat 12. The inflated and deployed airbag 30 directly presses and restrain the occupant P. Thereafter, the gas within the airbag 30 is discharged to the outside of the airbag 30 through the vent hole 40 provided in the airbag 30. The impact transmitted to the occupant P through the body side portion 11 from the side direction is reduced on the basis of the inflation and deployment of the airbag 30 as mentioned above, and the reduction of the internal pressure of the airbag 30 caused by the discharge of the gas.

The basic structure of the side airbag apparatus is as follows. In the present embodiment, in addition to the basic structure, the following contrivances (A) and (B) are applied to the vent hole 40 and the folding method of the airbag 30.

(A) The vent hole 40 is provided at the position which satisfies the following conditions 1 to 3.

Condition 1: the vent hole 40 is located in a portion of the airbag 30 that is left in the vehicle seat 12 at a time when the airbag 30 is inflated and deployed outside of the vehicle seat 12.

Condition 2: no constituting member of the vehicle seat 12 exists near the vent hole 40, and the space for discharging the gas from the vent hole 40 exists near the vent hole 40.

Condition 3: the vent hole 40 is away from the gas outlet 52 of the inflator 51.

The position satisfying the conditions 1 to 3 exists between the gas outlet 52 of the inflator 51 and at least one of an upper end and a lower end of the rear portion of the airbag 30. In the present embodiment in which the inflator 51 is arranged vertically in the lower end of the rear portion of the airbag 30, and the gas outlet 52 is provided in the upper portion of the inflator 51, the portion near the upper end of the rear portion of the airbag 30 is set as a position in which the vent hole 40 is formed.

This position is on the fold line 32 in the middle of the deployed base fabric sheet 31 before being folded into two, and in the vicinity of the upper end of the base fabric sheet 31, as shown in FIG. 4A. The vent hole 40 is constituted by a slit extending in the vertical direction along the fold line 32. In other words, the vent hole 40 is provided along the fold line in the airbag 30 in the deployed state without being filled with the gas.

As shown in FIG. 5, in a state in which the inflator 51 is fixed to the side frame portion 16, the vent hole 40 is open to a rear side. Further, a space between the inflator 51 and the back board 18 is utilized as a discharging space 22. Since the vent hole 40 is provided at the position mentioned above, the vent hole 40 faces the discharging space 22. The number of the vent hole 40 is one, however, may be set to two or more.

(B) The airbag 30 is folded in a manner which satisfies the following condition 4, for setting the airbag module AM in the storage mode.

Condition 4: a portion of the airbag 30 that is in the vicinity of the vent hole 40 and between the vent hole 40 and the gas outlet 52 starts and finishes being inflated in a final stage of the deployment and inflation of the airbag 30.

The airbag 30 folded in two or more directions is generally inflated and deployed in an inverted order to the folded order. In order to allow a portion in the vicinity of the vent hole 40 to start and finish being inflated in a final stage of the deployment and inflation of the airbag 30, it is necessary to fold the portion in the vicinity of the vent hole 40 in a primary stage of the folding.

In this regard, the airbag 30 in the deployed state without being filled with the gas is folded toward the inflator 51 from the end portion near the vent hole 40 at the beginning. At a time of folding, a mountain fold line 41 and a valley fold line 42 which extend linearly in a front-back direction are set in the airbag 30, as shown in FIG. 3. The mountain fold line 41 is set to a lower side of the airbag 30, and the valley fold line 42 is set to an upper side of the airbag 30, respectively. The inflator 51 is positioned below the mountain fold line 41 of the airbag 30. Further, a major part of the vent hole 40 is positioned above the valley fold line 42 of the airbag 30. In the present embodiment, a part of the vent hole 40 is positioned between the valley fold line 42 and the mountain fold line 41. However, the entire vent hole 40 may be positioned above the valley fold line 42.

A portion in an upper side than the mountain fold line 41 of the airbag 30 is mountain folded to a vehicle outer side along the mountain fold line 41. A portion in an upper side than the mountain fold line 41 is folded back to a far side of the sheet of the drawing in such a manner as to get the fold line out to an outer side. Further, the portion in an upper side than the valley fold line 42 of the airbag 30 is valley folded along the valley fold line 42. The portion in the upper side than the valley fold line 42 is folded back to a far side of the sheet of the drawing in such a manner as to get the fold line into an inner side. At this time, the vent hole 40 is also valley folded together with the airbag 30.

Figure 7:
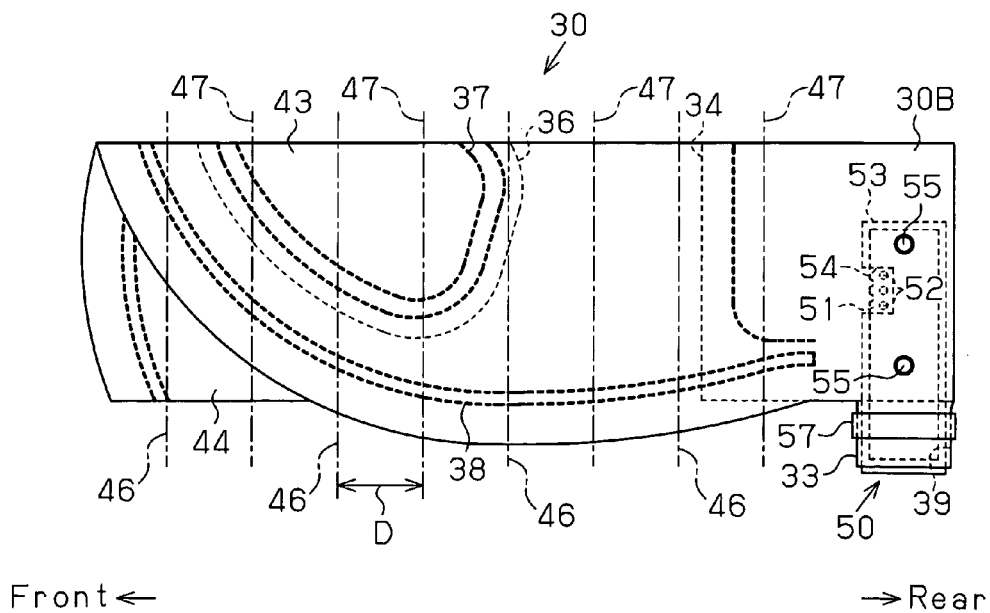
FIG. 7 is a side view showing the airbag module seen from the vehicle inner side, when the airbag is being folded.
Figure 8:
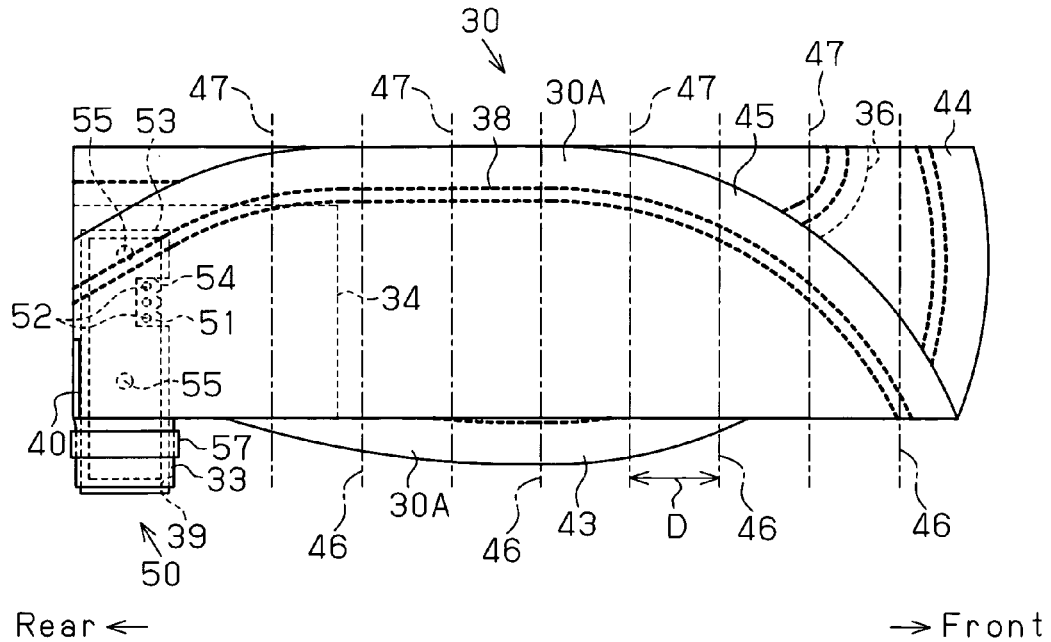
FIG. 8 is a side view showing the airbag module seen from the vehicle outer side, when the airbag is being folded.

As mentioned above, the airbag 30 is folded in such a manner as to draw Z along the vertical direction. Accordingly, the airbag 30 is folded to have a substantially rectangular shape extending in the front-back direction, as shown in FIGS. 7 and 8, which corresponds to a transitional form in the process of making the airbag 30 suitable for storing. FIG. 7 shows a state in which the airbag 30 is seen from the vehicle inner side. FIG. 8 shows a state in which the airbag 30 is seen from the vehicle outer side.

The airbag 30 is folded back two times toward the inflator 51 from the upper end close to the vent hole 40. Accordingly, the airbag 30 has three-layered folded portions 43, 44 and 45.

Next, the airbag 30 mentioned above is accordion folded from a front end toward a rear side. At a time of accordion folding, a plurality of mountain fold lines 46 and valley fold lines 47 extending in the vertical direction are set in the airbag 30. The intervals between the mountain fold lines 46 and the valley fold lines 47 are equal to the folding width D when the airbag 30 is accordion-folded. The airbag 30 is folded back while changing a folding direction from the front end to the rear side at a folding width D, along the mountain fold line 46 and the valley fold line 47.

Figure 9A:
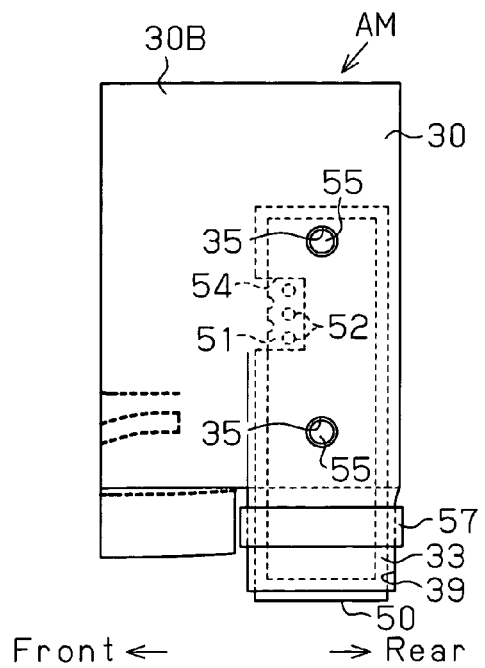
FIG. 9A is a side view showing the airbag module in a storage mode seen from the vehicle inner side.
Figure 9B:
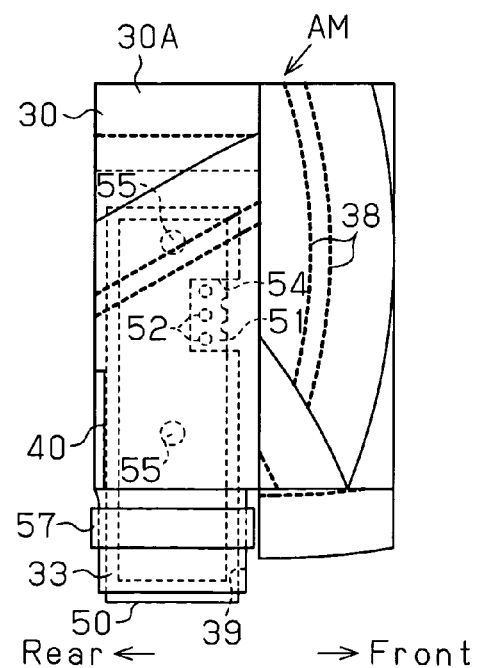
FIG. 9B is a side view showing the airbag module as seen from the vehicle outer side.

The airbag module AM is folded in a storage mode as shown in FIGS. 9A and 9B by folding the airbag 30 in two directions as mentioned above. FIG. 9A shows a state in which the airbag module AM is seen from the vehicle inner side. FIG. 9B shows a state in which the airbag module AM is seen from the vehicle outer side.

A plurality of sections of the airbag module AM are bundled by a binding tape (not shown). In other words, the airbag module AM is held in a state (the storage mode) in which the airbag 30 is folded, by the binding tape.

The side airbag apparatus includes, besides the airbag module AM, an impact sensor and a controller, which are not shown. The impact sensor is configured by, for example, an acceleration sensor, and is provided, for example, in the body side portion 11. The impact sensor detects impact applied from the side of the body side portion 11. The controller controls operation of the inflator 51 based on a detection signal from the impact sensor.

In the side airbag apparatus, if an impact equal to or more than a predetermined value is applied to the body side portion 11, and the impact is detected by an impact sensor, a control apparatus outputs a drive current to the inflator 51 on the basis of the detection signal from the impact sensor. The drive current heats the inflator 51 so that high temperature and pressure gas is generated from gas generating agent in the inflator 51. The gas is jetted out forward from the gas outlet 52 through the window portion 54 of the retainer 53. Further, since the pressure of the gas is applied to each of the portions of the airbag 30 in the storage mode, the inflation of the airbag 30 is started.

The airbag 30 is provided with the vent hole 40 of the gas. However, the gas is hardly discharged from the vent hole 40 in the initial stage of the inflation of the airbag 30. This is because the vent hole 40 is provided between the gas outlet 52 of the inflator 51 and at least one of the upper end and the lower end of the rear portion of the airbag 30, and is away from the gas outlet 52. Particularly, in the present embodiment, in which the inflator 51 is arranged vertically in the lower end of the rear portion of the airbag 30, and the gas outlet 52 is provided in the upper portion of the inflator 51, the vent hole 40 is provided in the vicinity of the upper end of the rear portion of the airbag 30, and is widely away upward from the gas outlet 52.

Another reason why the gas is hardly discharged from the vent hole 40 is that the airbag 30 is folded in such a manner that the portion that is in the vicinity of the vent hole 40 and between the vent hole 40 and the gas outlet 52 starts and finishes being inflated in a final stage of the deployment and inflation of the airbag 30. In other words, the gas is hardly discharged because the vent hole 40 is positioned at the position at which the inflation of the airbag 30 is finally started and finished. Accordingly, the gas is hardly discharged from the vent hole 40 until the portion in the vicinity of the vent hole 40 of the airbag 30 is inflated in the terminal end of the inflating and deploying period.

If the pressure of the gas starts being applied, each of the portions of the airbag 30 starts inflating, and is unfolded. However, the section which is folded from the front end of the airbag 30 toward the rear side prevents the section which is folded from the end portion in the vicinity of the vent hole 40 toward the inflator 51 from inflating. Accordingly, the airbag 30 which is folded in two directions as mentioned above is inflated and deployed as follows in the inverted order to the folding order for forming the storage mode.

The airbag 30 starts inflating while being unfolded (deployed) from the rear portion toward the front end, in the first instance. When the forward deployment makes progress to some extent, the airbag 30 starts inflating while being unfolded from the inflator 51 toward the vent hole 40, as shown in FIGS. 10A to 10C. FIGS. 10A to 10C show an example in which the vent hole 40 is provided only in the folded portion 45 for convenience of explanation. Even if a part of the vent hole 40 exists in the folded portion 44, the airbag 30 is unfolded in the same manner as the case where no part of the vent hole 40 exists in the folded portion 44.

At a time of starting the inflation mentioned above, the gas jetted out from the inflator 51 (refer to FIGS. 9A and 9B) flows into the folded portion 43 which is closest to the inflator 51 in the three layers of folded portions 43 to 45, in the first instance. Accordingly, as shown in FIGS. 10A and 10B, the folded portion 43 is inflated, and presses the folded portions 44 and 45 which are not inflated yet. The folded portions 44 and 45 which are not inflated include the folded portion 45 provided with the vent hole 40. Since the folded portion 45 is pressed by the folded portion 43, the vent hole 40 is maintained in the closed state. Accordingly, the gas is hardly discharged from the vent hole 40.

When the inflation mentioned above make progress to some extent, the gas starts flowing into the folded portion 44 which is adjacent to the folded portion 43. Accordingly, as shown in FIG. 10C, the folded state between the first folded portion 43 and the second folded portion 44 is unfolded. At this time, the second folded portion 44 is inflated by the gas, and presses the folded portion 45 which is not inflated yet. Since the folded portion 45 is pressed by the folded portion 44 as mentioned above, the state in which the vent hole 40 is closed is maintained. Accordingly, the gas is hardly discharged from the vent hole 40.

As mentioned above, the gas inflates the folded portions 43 and 44 in this order toward the folded portion 45 provided with the vent hole 40, and unfolds the folded state between the folded portions 43 to 45. At this time, the folded portions 44 and 45 which are not inflated yet are respectively pressed by the inflating folded portions 43 and 44. Accordingly, since the state in which the vent hole 40 is closed is maintained, the gas is hardly discharged from the vent hole 40. Further, since the folded portions 43 and 45 are structured in three layers, the pressing by the inflating folded portions 43 and 44 is maintained. Accordingly, the period until the gas reaches the folded portion 45 provided with the vent hole 40 is extended. Therefore, it is possible to delay the timing at which the gas starts being discharged from the vent hole 40.

Figure 11:
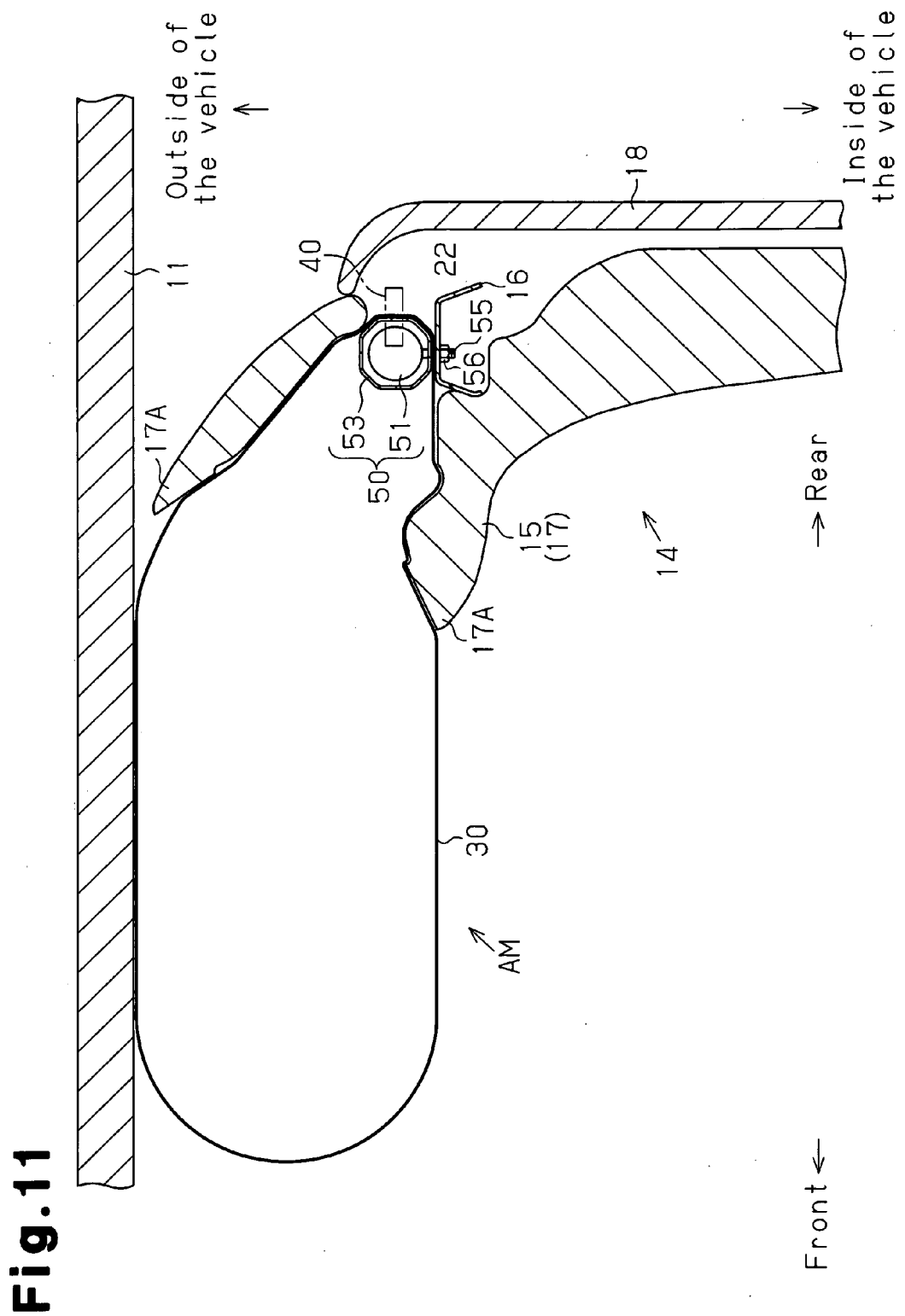
FIG. 11 is a partially plan cross-sectional view showing a state in which the airbag shown in FIG. 5 has shot out of the seat back so as to be inflated and deployed.

In connection with the inflation of the airbag 30 which is folded in the front-back direction and the vertical direction, the seat pad 17 is pressed by the airbag 30, and is broken at the breakable portion 21 (refer to FIG. 6) as shown in FIG. 11. Accordingly, the airbag 30 shoots out from the broken position to the seat back 14 in a state of leaving a part of the airbag 30 within the seat back 14. Further, the airbag 30 is inflated and deployed forward between the vehicle seat 12 and the body side portion 11 in the outside of the vehicle seat 12.

When the inflation of the folded portions 43 to 45 in the airbag 30 makes progress, and the gas reaches a boundary between the folded portion 45 having the vent hole 40 and the folded portion 44, the folded state of the folded portion 45 is unfolded. Further, when the gas reaches the portion in the vicinity of the vent hole 40, the inflation of the folded portion 45 is started. At this time, since the vent hole 40 faces the discharging space 22 (refer to FIG. 11), the gas within the airbag 30 is smoothly discharged to the discharging space 22 through the vent hole 40 without interfering with the constituting member of the vehicle seat 12. In connection with the discharge of the gas mentioned above, the internal pressure of the airbag 30 is lowered.

Figure 12A:
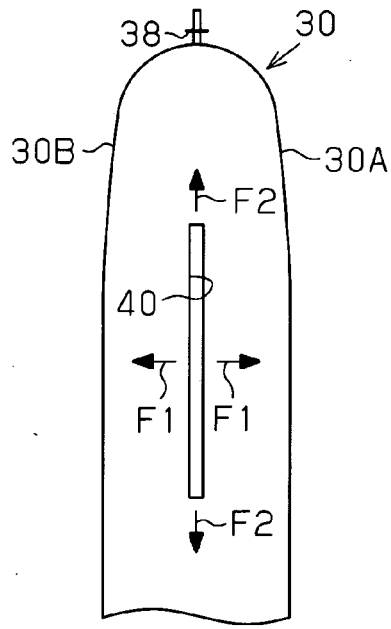
FIG. 12A is a schematic view showing a state of a vent hole at a time of free inflation of the airbag.

In the present embodiment, the airbag 30 is constituted by one base fabric sheet 31, and the vent hole 40 constituted by the slit is provided in the bent portion of the airbag 30. In accordance with this structure, the airbag 30 is exposed to a force F1 inflating the airbag 30 in a direction which is orthogonal to a length direction of the vent hole 40, that is, the force F1 opening the vent hole 40 in the same direction, as shown in FIG. 12A, at a time of a free inflation of the airbag 30 which does not accompany the restraint of the occupant P. However, at a time of the free inflation of the airbag 30, a force F2 inflating the airbag 30 in the length direction of the vent hole 40 is also applied to the airbag 30. Since both forces F1 and F2 are applied to the airbag 30 in a balanced manner, it is possible to inhibit the vent hole 40 from being opened widely in the direction which is orthogonal to the length direction.

Figure 12B:
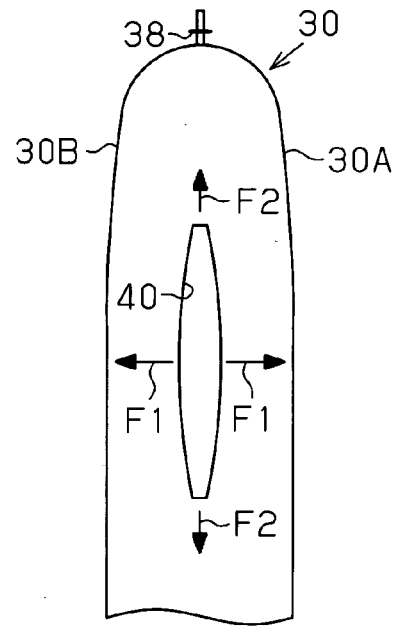
FIG. 12B is a schematic view showing a state of the vent hole at a time when the airbag restrains the occupant.

In accordance with the structure mentioned above, it is possible to delay the timing at which the discharge of gas from the vent hole 40 is started and the internal pressure of the airbag 30 starts being lowered. Accordingly, the gas is hardly discharged unnecessarily through the vent hole 40 at the starting time of inflation of the airbag 30. Further, when the inflated and deployed airbag 30 is interposed between the occupant P and the body side portion 11 making an intrusion into the passenger compartment so as to restrain the occupant P, the force F1 becomes larger than the force F2 as shown in FIG. 12B. Accordingly, since the forces F1 and F2 become off balance, and the vent hole 40 is opened in the direction which is orthogonal to the length direction, a lot of gas is discharged from the vent hole 40, and the internal pressure of the airbag 30 is allowed to be lowered. The impact transmitted to the occupant P from the side direction through the body side portion 11 is reduced on the basis of the inflation and deployment of the airbag 30, and the reduction of the internal pressure of the airbag 30 in connection with the discharge of the gas as mentioned above.

In this case that the vent hole 40 is provided in the vehicle inner side in the airbag 30 in the state of being deployed without being filled with the gas, there is a risk that the gas discharged from the vent hole 40 to the vehicle inner side comes into contact with the occupant P at a time when the airbag 30 is inflated and deployed outside of the vehicle seat 12. Further, in the case that the vent hole 40 is provided in a front end of the airbag 30, if any interfering object exists in the inflating and deployment region of the airbag 30 between the vehicle seat 12 and the body side portion 11 at a time when the airbag 30 is inflated and deployed outside the vehicle seat 12, there is a risk that the gas discharged forward from the vent hole 40 comes into contact with the interfering object. Further, in the case that the vent hole 40 is provided in the vehicle outer side of the airbag 30, since the vent hole 40 is closed by the body side portion 11 at a time when the airbag 30 is inflated and deployed outside the vehicle seat 12, there is a risk that the gas may be insufficiently discharged from the vent hole 40.

In this regard, in accordance with the present embodiment, the vent hole 40 is positioned within the seat back 14 in a state in which the airbag 30 is set to the storage mode so as to be incorporated within the seat back 14. Further, the vent hole 40 keeps being positioned within the seat back 14 even in the period after the inflation of the airbag 30 is started until it is finished. Accordingly, the gas within the airbag 30 is discharged into the seat back 14 through the vent hole 40. Accordingly, the gas discharged from the vent hole 40 does not directly come into contact with the occupant P and the interfering object in the inflating and deploying region. Further, the vent hole 40 is not closed by the body side portion 11, and the gas is smoothly discharged from the vent hole 40.

The preferred embodiment has the following advantages.

(1) The vent hole 40 is provided between the gas outlet 52 of the inflator 51 and at least one of the upper end and the lower end in the rear portion of the airbag 30. Accordingly, the vent hole 40 is arranged at the position which is away from the inflator 51. Therefore, the gas is hardly discharged from the vent hole 40 in the initial stage of the inflation of the airbag 30. Particularly, in accordance with the present embodiment in which the inflator 51 is arranged in the lower end of the rear portion of the airbag 30, the vent hole 40 is arranged at the position which is widely away from the inflator 51, by providing the vent hole 40 in the vicinity of the upper end of the rear portion of the airbag 30. Therefore, it is possible to further ensure that the gas is hardly discharged from the vent hole 40.

(2) The airbag 30 is folded in such a manner that the portion that is in the vicinity of the vent hole 40 and between the vent hole 40 and the gas outlet 52 starts and finishes being inflated in a final stage of the deployment and inflation of the airbag 30. Accordingly, in addition to the advantage (1) mentioned above, it is possible to further inhibit the gas from being discharged from the vent hole 40 in the initial stage of the inflation of the airbag 30.

As a result, it is possible to reduce the loss of the gas caused by the gas discharge in the initial stage of the inflation of the airbag 30. In connection with this, since it is possible to inhibit the amount of gas used for inflating and deploying the airbag 30 from being reduced, it is possible to suppress the reduction of the deploying speed of the airbag 30. In this case, since the vent hole 40 is positioned at the position which is widely away from the inflator 51, it is possible to easily fold the airbag 30 in such a manner that the portion that is in the vicinity of the vent hole 40 and between the vent hole 40 and the gas outlet 52 starts and finishes being inflated in a final stage of the deployment and inflation of the airbag 30.

(3) The vent hole 40 is constituted by the slit extending along the folded portion of the airbag 30 in the state of being deployed without being filled with the gas. Accordingly, the airbag 30 is exposed in the balanced manner to the force F1 inflating the airbag 30 in the direction which is orthogonal to the length direction of the vent hole 40, and the force F2 inflating the airbag 30 in the length direction of the vent hole 40, at a time of the free inflation of the airbag 30. Accordingly, it is possible to inhibit the vent hole 40 from being opened widely in the direction which is orthogonal to the length direction. Therefore, it is possible to inhibit the gas from being unnecessarily discharged from the vent hole 40, and it is possible to more reliably obtain the advantage (2).

(4) The airbag 30 in the state of being deployed without being filled with the gas is folded from the upper end in the vicinity of the vent hole 40 toward the inflator 51, and is further folded backward from the front end, at a time of folding the airbag 30 in the storage mode. Accordingly, the airbag 30 can be inflated and deployed from the rear portion toward the front end by the gas from the inflator 51, and the airbag 30 can be inflated and deployed from the inflator 51 to the vent hole 40 from the middle thereof. Therefore, it is possible to allow the portion that is in the vicinity of the vent hole 40 to start and finish being inflated in a final stage of the deployment and inflation of the airbag 30, and it is possible to more reliably obtain the advantage (2).

(5) The three layers of folded portions 43 to 45 are formed by folding back the airbag 30 from the upper end in the vicinity of the vent hole 40 toward the inflator 51. Accordingly, it is possible to inflate the folded portions 43 to 45 in this order from the folded portion 43 which is close to the inflator 51 toward the folded portion 45 provided with the vent hole 40, and unfold the folded state between the folded portions 43 to 45. At this time, it is possible to press the folded portions 44 and 45 which are not inflated yet by the inflating folded portions 43 and 44. Accordingly, it is possible to maintain the vent hole 40 in the closed state, and it is possible to inhibit the gas from being discharged from the vent hole 40.

(6) The vent hole 40 provided in the airbag 30 is provided in the position which is left within the seat back 14 even after being inflated and deployed outside of the vehicle seat 12. Accordingly, it is possible to discharge the gas within the airbag 30 to the inside of the vehicle seat 12 through the vent hole 40. As a result, it is possible to inhibit the gas from the vent hole 40 from directly coming into contact with any interfering object existing in the inflating and deploying region between the body side portion 11 and the vehicle seat 12, and the occupant P seated on the vehicle seat 12. Further, it is possible to inhibit the vent hole 40 from being closed by the body side portion 11.

(7) The discharging space 22 is provided between the inflator 51 and the back board 18 which is away backward from the inflator 51. The vent hole 40 is provided in such a manner as to face the discharging space 22. Accordingly, the gas within the inflated and deployed airbag 30 is discharged to the discharging space 22 through the vent hole 40, without interfering with the constituting member of the vehicle seat 12. Further, it is not necessary to provide the discharging space 22 independently within the seat back 14.

The present invention may be embodied in the following forms.

Figure 13:
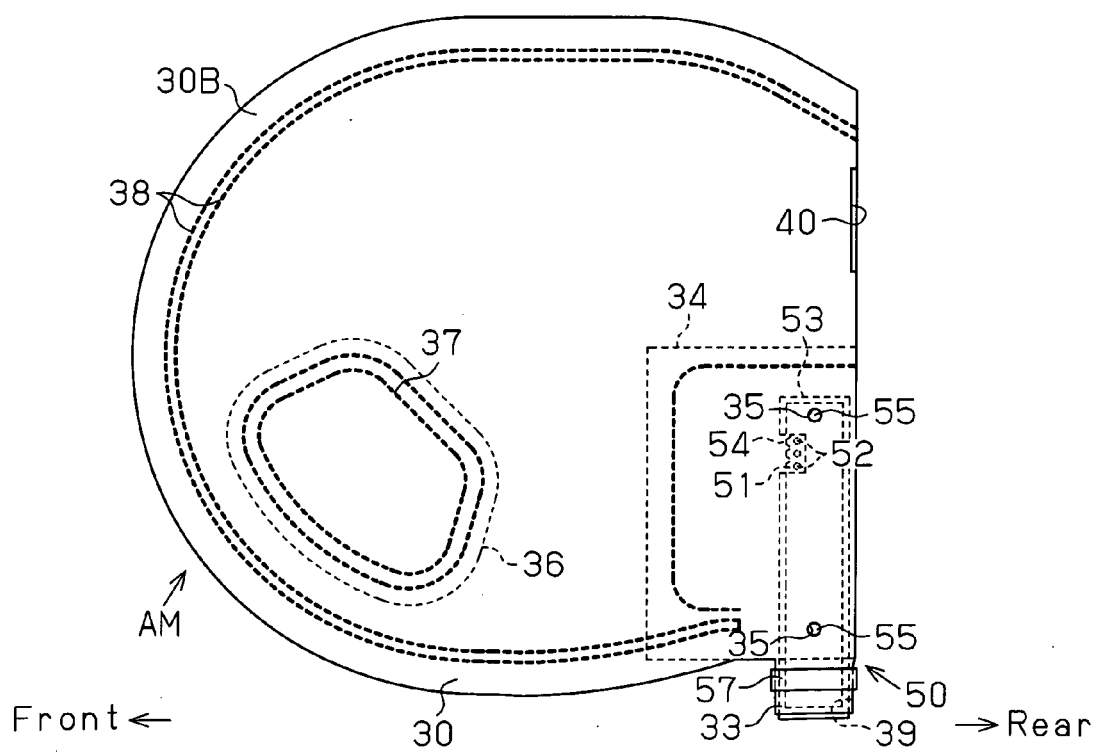
FIG. 13 is a side view showing an airbag module of a side airbag apparatus using an inflator having a different length from the embodiment of FIGS. 1 to 12B.

The present invention may be applied to a side airbag apparatus using an inflator 51 having a different length from the present embodiment. FIG. 13 shows an embodiment using a longer inflator 51 than the present embodiment. In this embodiment, the inflator 51 is arranged from the center of the rear portion of the airbag 30 to the lower end. The gas outlet 52 is positioned in the center of the rear portion of the airbag 30. The vent hole 40 is provided between the upper end of the rear portion of the airbag 30 and the gas outlet 52.

The present invention may be applied to a side airbag apparatus in which the inflator 51 is arranged at a different position from the present embodiment. The position of the vent hole 40 may be changed in correspondence to the position of the inflator 51.

Figure 14:
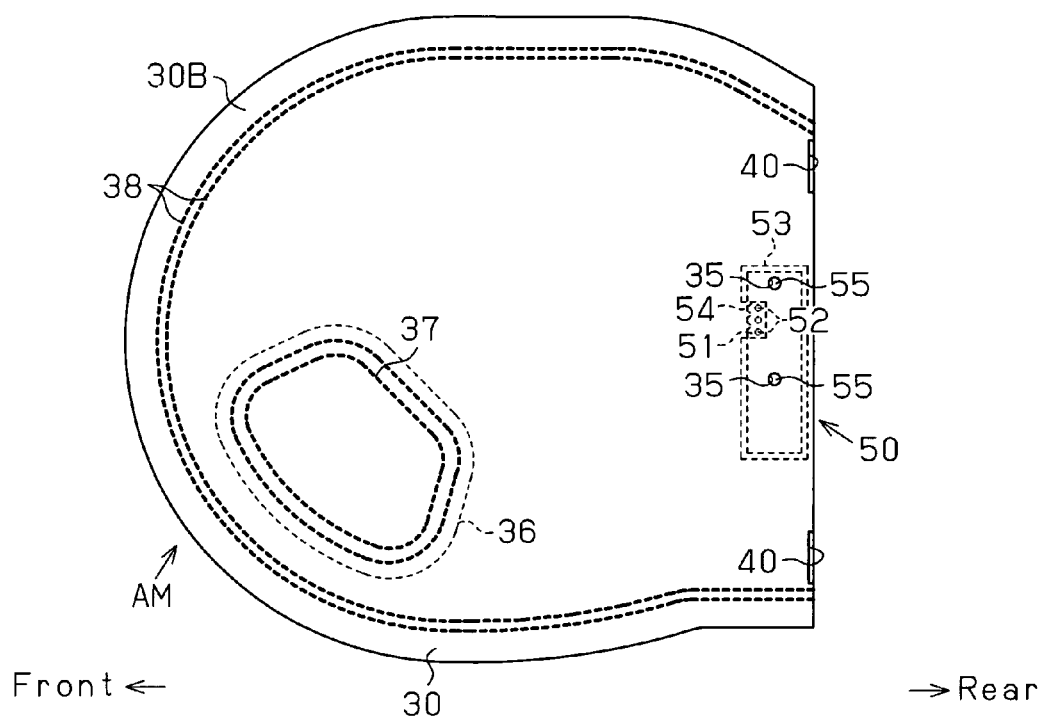
FIG. 14 is a side view showing an airbag module of a side airbag apparatus in which an inflator is arranged in a different section from the embodiment of FIGS. 1 to 12B.

For example, as shown in FIG. 14, the inflator 51 may be arranged in the center of the rear portion of the airbag 30. In this case, the vent hole 40 may be provided "(i) between the upper end of the rear portion of the airbag 30 and the gas outlet 52", or may be provided "(ii) between the lower end of the rear portion of the airbag 30 and the gas outlet 52". Further, as shown in FIG. 14, the vent hole 40 may be provided in both positions (i) and (ii) mentioned above. Further, the inflator 51 may be arranged in the upper portion of the rear portion of the airbag 30. In this case, the vent hole 40 is provided in the vicinity of the lower end of the airbag 30.

In the present embodiment, a vent hole 40 constituted by the slit may be provided along the peripheral edge portion of the airbag 30, in place of the bent portion of the base fabric sheet 31. In this case, the vent hole 40 is provided in a part of the peripheral edge coupling portion 38. Further, the same operations and advantages as those of the present embodiment are obtained.

As is different from the present embodiment, in the case where the airbag 30 is formed by coupling two base fabric sheets 31 in their peripheral edge portions, it is desirable to provide a vent hole 40 constituted by the slit along the peripheral edge portion of the airbag 30. In this case, in the same manner as the case where the airbag 30 is formed from one base fabric sheet 31, the vent hole 40 is provided between the gas outlet 52 and at least one of the upper end and the lower end of the rear portion of the airbag 30.

In accordance with this, it is possible to obtain the same operations and advantages as those of the present embodiment. In other words, the airbag 30 receives, in the balanced manner, the force F1 inflating both base fabric sheets 31 in the direction which is orthogonal to the length direction of the vent hole 40, and the force F2 inflating both base fabric sheets 31 in the length direction, at a time of the free inflation of the airbag 30. Accordingly, since the vent hole 40 is inhibited from being opened widely in the direction which is orthogonal to the length direction, it is possible to inhibit the gas from being unnecessarily discharged from the vent hole 40.

The airbag 30 in the state of being deployed without being filled with the gas may be folded from the upper end which comes close to the vent hole 40 toward the inflator 51 in a different manner from the present embodiment.

Further, the airbag 30 in the state of being deployed without being filled with the gas may be folded from the front end to the rear side in a different manner from the present embodiment. For example, the airbag 30 may be folded in a roll shape from the front end to the rear side.

The airbag 30 may be folded back at three or more times from the upper end which comes close to the vent hole 40 toward the inflator 51. Accordingly, the airbag 30 can have three or more layers of folded portions.

The vent hole 40 may have the other shapes than the slit.

The invention claimed is:

1. A side airbag apparatus comprising an airbag stored within a vehicle seat, a rear end portion of the airbag being fixed to the vehicle seat, and an inflator arranged within the rear end portion of the airbag and fixed to the vehicle seat, wherein
   a gas is jetted out from the inflator in correspondence to an impact applied to a vehicle from a side direction, and the airbag is caused to shoot out forward from the vehicle seat by the gas,
   the airbag is inflated and deployed between a body side portion of the vehicle and the vehicle seat,
   the airbag has a vent hole for discharging the gas within the airbag,
   the vent hole is provided between a gas outlet of the inflator and at least one of an upper end and a lower end of a rear portion of the airbag,
   the airbag is folded so that a portion of the airbag that is in the vicinity of the vent hole and between the vent hole and the gas outlet starts inflation and completes inflation during a final stage of the deployment and inflation of the airbag, and
   the inflator has the gas outlet in an upper portion, wherein the inflator is arranged in a lower end of the rear portion of the airbag, and wherein the vent hole is provided in the vicinity of an upper end of the rear portion of the airbag.

2. The side airbag apparatus according to claim 1, wherein the airbag is formed by folding one base fabric sheet forward in its intermediate portion, overlapping one base fabric sheet and coupling a peripheral edge portion except the bent portion, and wherein the vent hole is constituted by a slit extending along a peripheral edge portion or a fold line of the airbag in a state of being deployed without being filled with the gas.

3. The side airbag apparatus according to claim 1, wherein the airbag is formed by folding two base fabric sheets in their peripheral edge portions, and wherein the vent hole is constituted by a slit extending along a peripheral edge portion of the airbag in a state of being deployed without being filled with the gas.

4. The side airbag apparatus according to claim 1, wherein the airbag in the state of being deployed without being filled with the gas is stored within the vehicle seat in a state of being folded toward the inflator from an end portion which comes close to the vent hole, and being folded backward from a front end of the airbag.

5. The side airbag apparatus according to claim 4, wherein the airbag has a folded portion of three or more layers, and wherein the folded portion is folded back toward the inflator from an end portion which comes close to the vent hole.

6. The side airbag apparatus according to claim 1, wherein the vent hole is provided in a portion of the airbag which is left in the vehicle seat at a time when the airbag is inflated and deployed outside of the vehicle seat.

7. The side airbag apparatus according to claim 1, wherein the vent hole faces a discharging space provided between the inflator and a back board which is away backward from the inflator.

* * * * *